Feb. 6, 1968    H. A. PISCIOTTA ETAL    3,368,013
METHOD OF MOLDING MULTI-VENTED HOLLOW ARTICLES
Filed June 17, 1965    3 Sheets-Sheet 1
FIG. 1
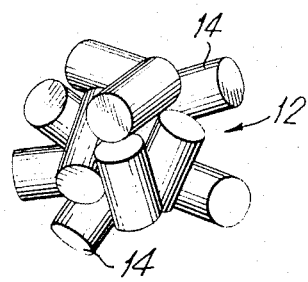
FIG. 2
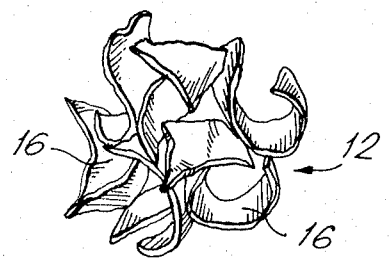
FIG. 3
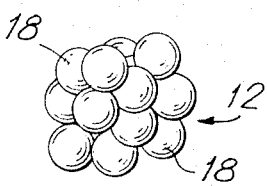
FIG. 4
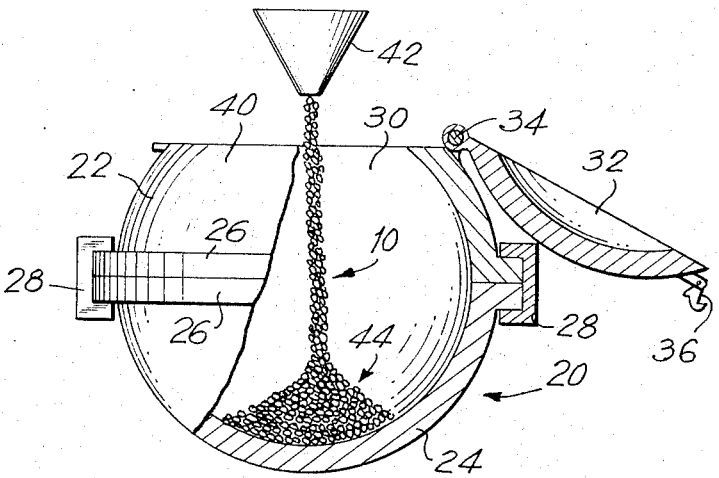
FIG. 5
INVENTORS
HUMBERT A. PISCIOTTA
BY ANTHONY T. PISCIOTTA, Jr.
Kinschstein, Kinschstein & Ottinger
ATTORNEYS Feb. 6, 1968    H. A. PISCIOTTA ETAL    3,368,013
METHOD OF MOLDING MULTI-VENTED HOLLOW ARTICLES
Filed June 17, 1965    3 Sheets-Sheet 2

INVENTORS
HUMBERT A. PISCIOTTA
BY ANTHONY T. PISCIOTTA, Jr.

Kinschstein, Kinschstein & Ottinger
ATTORNEYS

Feb. 6, 1968    H. A. PISCIOTTA ETAL    3,368,013
METHOD OF MOLDING MULTI-VENTED HOLLOW ARTICLES
Filed June 17, 1965    3 Sheets-Sheet 3
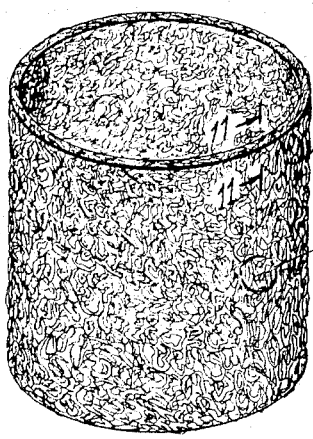
FIG. 10
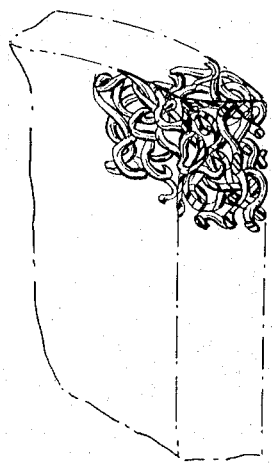
FIG. 11
FIG. 10a
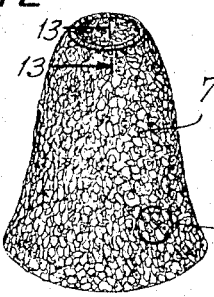
FIG. 12
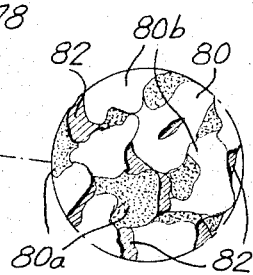
FIG. 12a
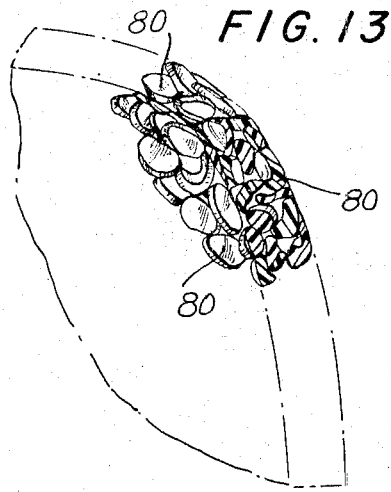
FIG. 13
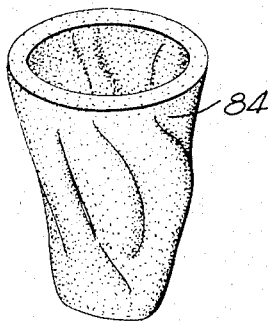
FIG. 14
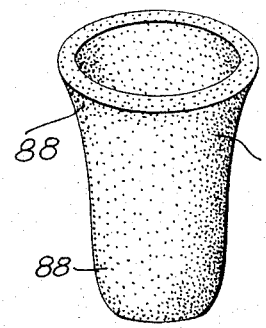
FIG. 15
INVENTORS
HUMBERT A. PISCIOTTA
BY ANTHONY T. PISCIOTTA, Jr.
Kinschstein, Kinschstein & Ottinger
ATTORNEYS

United States Patent Office 3,368,013
Patented Feb. 6, 1968

3,368,013
METHOD OF MOLDING MULTI-VENTED HOLLOW ARTICLES
Humbert A. Pisciotta, Islip Terrace, and Anthony T. Pisciotta, Jr., Glendale, N.Y., assignors to Jefferson Tank & Seat Mfg. Co., Inc., Brooklyn, N.Y., a corporation of New York
Filed June 17, 1965, Ser. No. 465,240
4 Claims. (Cl. 264—125)

ABSTRACT OF THE DISCLOSURE

A method of making multi-vented hollow articles by charging a hollow sectional mold with a mass of coarse granular particles in a quantity sufficient to cover the internal surface of the mold to a predetermined shallow depth, then rotating the mold about compound axes so as to distribute the particles around the internal surface of the mold, while the mold is rotating applying heat to the mold in such a manner that the particles fuse at their skins and autogenously weld to one another only where they are in contact to form a hollow shell leaving portions of the particles spaced apart so as to provide interstices therebetween which constitute multiple vents in the shell, then opening the mold and forming an opening in the shell in registry with the mold opening, and next concurrently cooling the mold and the shell by inserting the mold into water while at the same time introducing water into the interior of the shell through the openings in the mold and in the shell and thus preventing distortion of the shell.

---

The multi-vented hollow articles which are shown and described but not claimed herein are shown, described and claimed in copending application Ser. No. 643,743, filed Nov. 4, 1966 and which is a division of the present application.

This invention relates to a method of making multi-vented hollow plastic articles.

It is the primary object of our invention to provide a molding method utilizing conventional rotational molding equipment for forming a hollow plastic article having a shell pervaded by a high density of randomly located through openings.

It is another object of our invention to provide a molding method for manufacturing a hollow plastic article constituting a shell formed from granular particles, the said particles at least partially retaining their before-molding individuality and being bonded each to its neighbors by interrupted surface-to-surface fusion with the consequent interstices between the particles providing through openings in the shell.

It is another object of our invention to provide a method for making multi-vented hollow plastic articles by utilizing conventional rotational molding equipment so that the finished articles molded by said method have shells which faithfully conform to the cavity of the mold.

In the conventional method of rotational molding wherein it is desired to form a hollow unvented article, a liquid charge of a synthetic material is introduced into the cavity of a multi-part sectional hollow mold. The quantity of the charge is far less than would be necessary to fill the mold cavity and is only sufficient to form a skin of some desired thickness over the entire periphery of the cavity of the mold. When the charge is located within the mold cavity, the mold is closed and is rotated about a plurality of transverse axes with the result that the charge is substantially uniformly distributed by rolling action around the entire periphery of the cavity. At the same time, the mold with its charge is heated in a heating chamber. The rotation of he mold and the simultaneous application of heat to the mold and its charge causes the charge, now distributed as a layer on the cavity surface, to first gel and then fuse.

Thereupon, the mold is removed from the heating chamber and cooled to below the fusing temperature of the charge. The mold is next opened and the finished article is removed. The completed article has a fully fused essentially homogeneous skin which is imperforate. United States Letters Patent No. 2,629,134 exemplicatively describes the conventional rotational molding process. Also well known is a similar process using a particulate fusible charge of thermoplastic materials which completely melts into a liquid in the mold with the material of each particle indistinguishably merged into those of all other particles.

We desire to produce a different product from that just described, to wit, hollow multi-vented molded articles, by the use of the same conventional rotational molding equipment. By the term "hollow multi-vented article," we mean a self-form-maintaining hollow molded article characterized by a shell permeated by a myriad of through openings. These openings are the interstices between coarse grained particles which comprise the shell of the article. The particles are affixed to one another by interrupted autogenous surface-to-surface bonding, so that at least to some extent the particles retain their before-molding individuality. In such an article, because the particles are randomly arranged and are not nicely interfitted, openings are formed between the particles where their surfaces are relatively spaced so that depending upon the desired sizes of the openings, the articles will permit the reflected passage of rays of light through the openings or will permit the restrained passage of fluids through its shell.

To form a multi-vented hollow article of the character described, we depart in two essential aspects from conventional rotational molding technique. However, we still employ conventional molding equipment. First, a predetermined quantity of a particulated charge of coarse granular material is introduced into the cavity of a sectional hollow mold. The quantity is sufficient to form only the shell of the ultimate molded article. The mold is closed and is rotated about compound axes. Heat is supplied to the mold depending in temperature and time upon the type of charge material, the average size of the particles and the thickness of the shell. Care is taken that the particles are not heated long enough to fuse into one homogeneous hollow mass. Rather, the particles are permitted by the application of heat at controlled temperature and time to autogenously bond only at their points of contact. By this method, a shell of touching semi-fused particles, optionally several particles in thickness, is formed which has an outer face that conforms to the shape of the surface of the mold cavity. However, the particles still retain some semblance of their own before-molding individuality. That is, the particles are bonded to one another by surface-to-surface contact and are spaced apart at areas of non-contact which results in a myriad of openings through the shell of the molded article. Said openings are randomly and fortuitously located, but are essentially of uniform high density throughout the skin of the article. It will be noted that to this point, conventional rotational molding equipment is entirely suitable for the commercial application of our method.

In the second aspect of our novel method wherein we depart from the technique of conventional rotational molding, after the mold is removed from the heating chamber, we substantially simultaneously cool to below the fusing temperature both the mold form and the mold charge which has now assumed a hollow shape conforming to the mold cavity. This is accomplished by immersing the mold into a cooling liquid bath while at the same time introducing a significant quantity of a cooling fluid into the interior of the hollow multi-vented article. When the mold is sufficiently cooled and the article is hardened, the mold sections are separated and the finished article is removed.

We have found that without the technique of substantially simultaneously cooling the exterior of the mold and introducing cooling fluid into the interior of the multi-vented article, and if we only cool the exterior of the mold as is usual in rotational techniques, the molded multi-vented article tends to shrink away from the cavity surface; this results in many twisted, distorted and unacceptable articles. With the simultaneous external and internal cooling above described, the shell of the finished hollow multi-vented article will conform faithfully to the contours of the mold cavity and production runs can be carried out efficiently with a minimum number of rejects.

Various other objects and advantages of our invention will in part be obvious and in part will be pointed out to the reader in the following description.

Our invention accordingly consists in the series of steps which will be exemplified in the molding method hereinafter described and of which the scope of application will be indicated in the appended claims.

In the accompanying drawings in which are shown the steps of our molding method and various articles formed by said method:

FIGS. 1, 2 and 3 illustrate, respectively, groups of cylindrical pellets, small turnings and spherical pellets which constitute different forms for the coarse granular particles of the mold charge;

FIG. 4 illustrates the step of introducing a particulate charge into the cavity of a two-part sectional mold;

FIG. 5 illustrates the step of rotating the closed mold about compound axes;

FIGS. 8, 10 and 12 illustrate hollow multi-vented articles of different configurations formed from different types of particulate charges, all of which have been molded by our novel molding method;

FIGS. 10a and 11 are enlarged, respectively, surface and cross-sectional views of the molded article illustrated in FIG. 10;

FIGS. 12a and 13 are enlarged, respectively, surface and cross-sectional views of the molded article illustrated in FIG. 12; and FIGS. 14 and 15 illustrate deformed articles typical of the rejects made when hollow multi-vented articles are produced without cooling the interiors of the articles concurrently with the cooling of the exterior of the mold.

Figure 6:
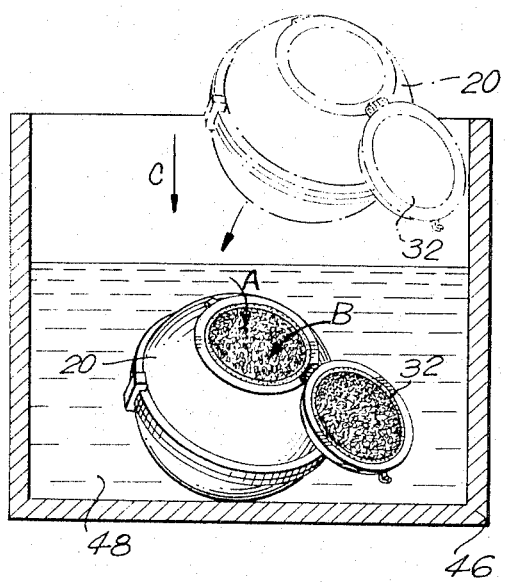
FIG. 6 illustrates the step of immersing the mold into a cooling liquid bath with the cover of the mold open so as to permit flow of the cooling liquid into the interior of the hollow molded article.

Referring now in detail to the drawings, the reference numeral 10 denotes a molding charge comprised of a mass of solid thermoplastic particles 12 which constitutes the granulated material from which the shells of our multi-vented articles are to be fabricated.

Each particle of the charge is a separate and distinct physical entity and may have any one of numerous different forms. Preferably, the particles comprising one charge are of like form since we believe that this yields the most desirable ornamental appearance. For example, and as shown in FIG. 1, the particles 12 can be in the form of small, short, cylindrical pellets 14, all the pellets being approximately of the same size and shape but, optionally, of different colors. All are of identical (save for color) composition. In FIG. 2 the particles are in the form of small scrapings or turnings 16 which are of similar curled yet somewhat varying figuration and dimensions. In FIG. 3, we illustrate a group of particles 12 each in the form of a small spherical pellet 18. The particles in these figures are merely exemplificative of the variety of forms which the coarse grained particles may take. The cylindrical pellets of FIG. 1 and the spherical pellets of FIG. 3 are appropriate when it is desired to form the same from virgin thermoplastic material while the turnings of FIG. 2 are most appropriate when the charge is formed from scrap material. Scrap material is satisfactory as long as the composition thereof is held within certain close tolerances so as to permit autogenous welding of only contacting surface portions. Virgin material is preferred.

As will be subsequently described, the volume and configuration of the particles have an influence upon the ultimate appearance of the self-form-maintaining shell of the article. That is to say, the larger the size of the particles, the larger will be the average size of the openings which pass through the shell of the finished article. Further, the initial shape of the particles themselves will be reflected in the texture of the skin of the finished article, since even after molding the articles maintain in some part their initial physical individuality.

The coarse grained particles may be formed from any suitable thermoplastic synthetic resin, as for example, polyethylene, cellulose acetate, cellulose acetate butyrate, polyvinyl, polypropylene, polybutylene, styrene, acrylic, ABS polymers, ethyl cellulose propionate, chlorinated polyether, polyvinyl chloride, polyvinylidene chloride, copolymers of methyl methacrylate and styrene, copolymers of butadiene and polystyrene, polyamide, and polycarbonate. Pigments or dyes in the material will yield any desired color in the finished product, and the use of differently colored coarse grained particles will engender a multi-colored pointilistic appearance of the finished article. Further, the particles may be opaque, translucent or transparent, or a mixture thereof, all of which will have an influence upon the esthetic effect of the finished article. Any density of thermoplastic material may be utilized depending on the desired stiffness of the finished product.

A sectional internal cavity mold 20 having a nonporous internal surface, conventional for use in multi-axis rotatable molding, is the matrix for the mold charge. Typically, the mold 20 is thin walled and includes an upper half 22 and a lower half 24. The halves 22, 24 at their zone of juncture each have an outwardly protuberant flange 26 and are held together by clamps 28 which press the flanges together so as to detachably secure the halves in their proper position to form a complete internal cavity 30. The mold 20 also includes a cover 32 which is hinged on one side to the body of the mold as at 34 and which is secured in closed position by a manually manipulatable latch 36. The cover closes a wide opening 40 at the top of the upper half of the mold through which the charge of the particles is admitted into the mold cavity.

The quantity of the charge introduced into the interior of the mold is sufficient to form the shell of the finished article. The charge, of course, is significantly less than would be necessary to fill the entire cavity. The quantity of the charge can be modified so as to form an article of any desired shell thickness, ranging from a minimum of one or a few particles in thickness which is yet strong enough to be self-supporting to a maximum thickness which still permits the formation of a hollow interior within the finished article.

FIG. 4 show the step of introducing the charge 10 into the mold cavity 30 by pouring the charge from a spout 42 in a stream through the opening 40 in the mold and directly into the interior of the mold 20. The cover 32 at this time is in its open position and the mold is below the fusion temperature for the plastic granules, usually being at room temperature or warm from a previous cycle that terminated in a cooling step. During this step, the charge forms a small pile as at 44 on the floor of the mold cavity.

As illustrated in FIG. 5, after the full charge has been introduced the cover 32 is closed to cap the opening 40 and is secured in this position by the latch 36. The mold 20 is placed into a conventional heating chamber and is slowly rotated by a conventional mechanism about plural mutually transverse axes. The directions of rotation of the mold are indicated by the arrows A and B in said figure. The closing of the cover 32 has completed the formation of an imperforate cavity 30 within the mold and the rotation of the mold about compound axes causes the granulated charge 10 to be distributed by gravity flow uniformly within the cavity and against the entire surface of the cavity. Suitable molds and apparatuses and methods for rotating molds about compound axes are shown and described in U.S. Letters Patent Nos. 2,569,869, 2,624,072, 2,629,131, 2,629,134, 2,696,024 and 3,079,644.

Depending upon such factors as the fusion temperature of the charge particles, the desired thickness of the shell of the finished article and the mass of the mold, the temperature of the heating chamber and the length of time for which the mold and charge is exposed to the heat chamber is carefully controlled so that the skins, i.e., outer surfaces of the particles, melt and fuse and weld together, i.e., autogenously bond, where they are in skin-to-skin contact. The internal temperature of the particles may be raised to a temperature at which the particles are in a semi-viscous state but it is not raised high enough for the particles to melt into a homogeneous mass. That is, the quantity of heat is controlled so that the particles do not freely flow into an unvented layer of uniform thickness and in which the particles are fully merged with one another, but, rather, the quantity of heat is controlled so that only the skins of the particles liquefy while the bodies of the particles substantially retain their individual premolding physical integrity to an extent that will depend upon the desired finished appearance of the article. The higher the temperature of the chamber and/or the longer the mold is permitted to remain at this elevated temperature, the more the interiors of the particles will soften and lose their individuality. However, so long as some degree of individuality, great or small, is retained, our invention will be carried out. The coarse grained particles thereby form a continuous coherent solid, though multivented, layer which includes areas of particle-to-particle contact. The particles at their areas of non-contact form interstices which permeates the shell layer of the finished article. Since the rotational molding has thoroughly mixed the charge and has distributed it in a substantially uniform thickness against the inner surface of the mold cavity, the openings although randomly located are generally of a uniform density at any given area throughout the shell. Because it takes a large number of particles to form the shell of the finished article, and because the contact of any particle with its neighbors forms several openings, there is a high density of openings in a unit area of the skin of the finished article.

A typical suitable heat prevailing in the heating chamber is about 500° F. externally of the mold and about 350° F.–400° F. in the mold. The heat is applied for a time period of from about 3 minutes to about 15 minutes. The time and temperature are influenced by the melt index of the thermoplastic material from which the particles 12 are formed in order to secure the skin fusion and the non-fusion of the interiors of the particles as described above.

In the next step in our novel process for forming a multi-vented hollow plastic article, both the interior of the article and the exterior of the mold are substantially simultaneously cooled to below the fusing temperature of the thermoplastic material. To this end, and as shown in FIG. 6, the mold 20 is removed from the heating chamber and its cover 32 is swung open. The opening of the cover forms a large gap or through aperture at the top of the article which is substantially of the same size as the diameter of the opening 40 in the top half of the mold wall, which aperture is desired to be provided in the finished article. Since the article has not as yet cooled, the layer which has formed against the inner surface of the cover 32 breaks away from the remainder of the shell of the article and remains against the inside of the cover (see FIG. 6) when said cover is opened. Jagged edges on the boundary of the aperture may be subsequently trimmed, if desired, to form a neat-looking finished hollow article.

The mold 20 with its cover open is next immersed into a cooling medium, either liquid or gaseous, preferably the former. By way of example, there is provided a tank 46 which contains a large quantity of a cooling liquid, for example, tap water 48 which is somewhat above room temperature due to repeated immersions of heated molds therein but which is held below a temperature at which it can scald workers by suitable introductions of fresh water at room temperature. The height of the water 48 at least after immersion of the mold is greater than the height of the mold 20. The water cools the exterior surface of the mold and at the same time rushes into the interior of the mold cavity internally of the shell of the still hot article as indicated by arrows A and B in FIG. 6. A downward force as indicated by the arrow C in FIG. 6 may be required to oppose the buoyancy of the mold before the cooling liquid pours into its interior. The molds shown in FIG. 6 are tilted to more clearly show the passage of liquid into the interior of the mold. Such tilting is not necessary.

The immersion of the mold into the cooling bath and the introduction of cooling liquid into the interior of the hollow article in the mold cavity quickly bring both the mold and the molded shell to below the fusion temperature of the charge material.

Figure 7:
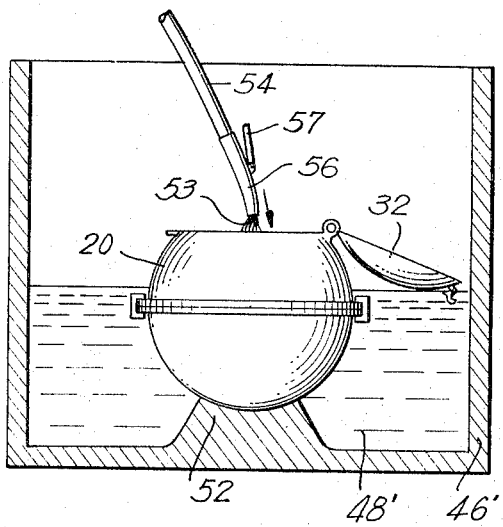
FIG. 7 illustrates an alternate cooling step showing the placement of the mold into a cooling liquid bath while utilizing a hose to direct a stream of cooling liquid into the interior of the hollow molded article.

FIG. 7 illustrates an alternative suitable manner for cooling the interior of the article and the exterior of the mold 30 at substantially the same time. In this alternative step, after the mold has been removed from the heating chamber, the cover 32 is opened and the mold is seated on a pedestal 52 at the bottom of another cooling tank 46'. The tank 46' also contains a cooling liquid 48' of sufficient quantity so that when the mold is placed therein the liquid surrounds a major portion of the mold. A cooling liquid 53 is introduced into the interior of the hollow article in the mold under pressure by a hose 54 which has a nozzle 56. A manually operable valve 57 is optionally provided to control the flow of liquid through said nozzle 56 into the mold interior.

If desired, moreover, cooling can be effected solely by the introduction of a cooling liquid into the interior of the mold and the interior of the article without simultaneously placing the mold in a cooling liquid. In such alternative method the cover 32 is opened and a cooling liquid introduced into the interior of the hollow article as by a hose; however, the mold is not immersed in a cooling liquid but rather is merely exposed to the ambient atmosphere.

After the aforesaid cooling, the mold is taken out of the cooling tank and the clamps 28 removed from the flanges 26 so that the sectional mold can be split to permit removal of the multi-vented hollow molded article.

Figure 8:
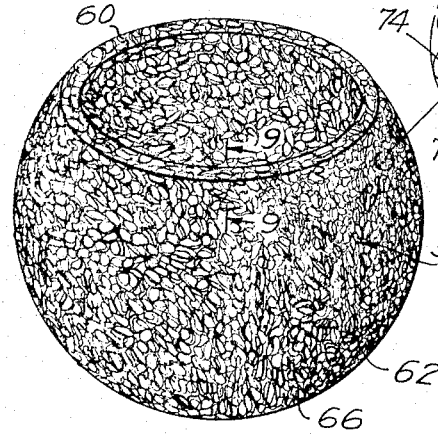

It is within the scope of our invention to form finished hollow articles of almost any three dimensional hollow configuration providing that there is at least one large opening therein. FIG. 8 shows a typical configuration for a finished stiff hollow multi-vented article 58. The article has the configuration of the major portion of a sphere. Said spherical configuration has been imparted to the shell of the finished article 58 by the configuration of the mold cavity 30. The finished article 58 has a truncated top, as at 60, initially formed by the opening of the cover 32 and then trimmed to a uniform neat finish.

Figure 8A:
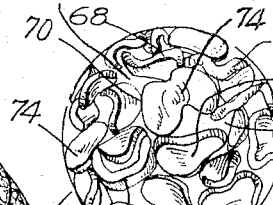
FIGS. 8a and 9 are enlarged, respectively, surface and cross-sectional views of the molded article illustrated in FIG. 8.

As is typical of all of the finished articles formed by our novel method, the article 58 comprises a shell 62 of generally small thickness, e.g., one-quarter-inch, as compared with the maximum diameter of the article, and is pervaded by a great multiplicity of small openings which cannot be distinguished in FIG. 8. The outside surface 66 of the finished article 58 is roughly textured. FIG. 8a is a blowup of a small exterior surface area of the article 58. The blowup shows that the shell comprises a multiplicity of coarse grained particles 68 which maintain their individualities to a substantial degree. The particles are joined to other like particles at random areas of surface-to-surface contact such as at 70. There are a sufficient number of surface-to-surface contacts and the junctures of the particles at these points are of sufficiently large area so that a self-form-maintaining wall is formed and so that each particle is bonded to at least one other and, more typically, several other particles.

Figure 9:
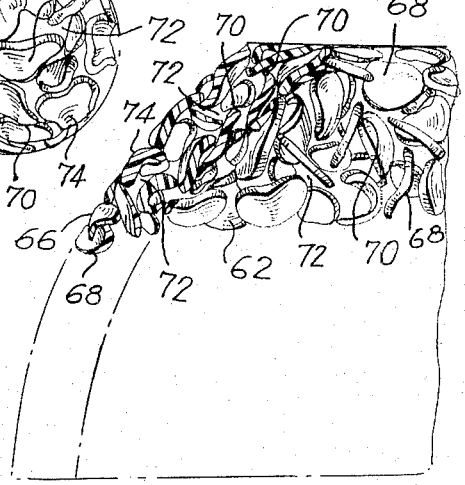

Because the fusion time and temperature has been carefully controlled as aforesaid, the particles have areas of non-contact with the other particles so that between the particles there are formed interstices, as at 72, which constitute the several openings to which reference previously has been made. It will be realized that a large number of these interstices may permit radial view directly through the skin of the article while other of these interstices penetrate through the skin shell along non-radial and/or nonlinear paths. That is, the structure of the articles may be described as a three-dimensional mesh or open mat with the interstices irregularly shaped and oriented so that liquid and fluid can pass freely through the shell of the article. As shown in FIGS. 8 and 9, the shell may be of a thickness which is the composite of several thicknesses of particles 68 and the particles which constitute the exterior surface of the finished article will have a portion thereof which has been shaped by direct face-to-face contact with the interior cavity and are thereby shaped to match the same. Such portions are designated by reference numeral 74 in FIGS. 8a and 9 and are shaded in FIG. 8a. The article 58 shown in FIG. 8 may be appropriate as a lighting fixture. Said article may be placed over a naked light bulb and it will thereafter diffuse the rays of said bulb by the passage of the light rays both directly through any translucent particles and by reflected passage of the rays through the openings in the shell. It will also permit passage of cooling air through the shell so that the temperature of the shell will not be raised to the point of deformation.

It will be observed that the particles 68 of the finished article 58 as shown in FIGS. 8, 8a and 9 have the configuration of deformed, e.g., cupped, arched and skewed, thin discs. However, the article was formed from a charge of pellets which were initially cylindrical in form, i.e., the cylindrical pellets 14 illustrated in FIG. 1. The unusual characteristic of the charge particles by which they have changed from a cylindrical shape to a thin disc shape is caused by a memory effect engendered when the cylindrical pellets were themselves formed, as by extrusion. Upon heating, these pellets, which are of polyethylene, contract in length and expand in diameter to assume disc-like shapes.

FIGS. 10, 10a and 11 illustrate an article 76 of hollow open-topped and closed bottom tubular shape. The article 76 has been formed from the small turnings 16 shown in FIG. 2 and, as illustrated in the enlargement of a surface area of the article in FIG. 10a, is comprised of numerous noodle-shaped twisted particles. The shell of the article may also be described as having a "lacy" look and it will be noted that the turnings of FIG. 2 have changed into a more elongated and smooth configuration than they had previously.

FIGS. 12, 12a and 13 illustrate a finished article 78 in the bell shape of a Christmas ornament and which was formed from the spherical pellets 18 illustrated in FIG. 3. As compared with the other articles 76 and 58, the article 78 has been held within the heating chamber for a longer period of time and/or at a more elevated temperature. This has caused the particles 80 to fuse to a greater degree than the particles of the other articles. The interstices 82 between said particles, hatched for the purpose of identification in FIG. 12a, are relatively less numerous, smaller in size, and lower in density. The particles for the article 78 were of two different colors, so that the skin of the finished article includes a conglomeration of particles 80a of one color and particles 80b of a different color.

In FIGS. 14 and 15 we have illustrated articles which, though made from an initial charge of coarse grained particles, were not simultaneously internally and externally cooled after the heating step. Rather, the molds for these articles when the same were removed from the heating chamber were only cooled externally as is the common and only practice in conventional rotational molding. The shells of the finished articles made in this manner tend to pull away from the cavity wall during the cooling step and thereby to produce an unacceptable reject. Such rejects may range from the article 84 illustrated in FIG. 14 which is extremely misshapen, shrunken and twisted to the articles 86 of FIG. 15 which has pulled away only slightly from the wall of the cavity and which consequently has shallow concavities 88 thereon where it has failed to faithfully conform to the shape of the mold cavity.

Our novel method for forming multi-vented hollow molded plastic articles has been carried out primarily through the use of conventional rotational molding equipment but which, nonetheless, has produced articles of the type desired. Producers of plastic articles may thereby be enabled to manufacture in great quantity by mass production techniques multi-vented hollow articles as described herein. The utilization of conventional rotational molding equipment for this purpose effects a great savings and stimulates competitive production of such articles without additional investment in new equipment.

A suitable length for the polyethylene cylindrical pellets is from 1/8 to 3/16 of an inch with a diameter of approximately 1/8 of an inch. In general, the long dimension of any of the charge particles will range from three times the diameter to one half the diameter.

It thus will be seen that we have provided molding methods which achieve the several objects of our invention and which are well adapted to meet the conditions of practical use.

As various possible embodiments might be made of the above invention, and as various changes might be made in the embodiments set forth, it is to be understood that all matter herein described or shown in the accompanying drawings is to be interpreted as illustrative and not in a limiting sense.

Having thus described our invention, we claim as new and useful and desire to secure by Letters Patent:

1. A method for molding hollow multi-vented articles of thermoplastic material said method comprising the steps of:
 (a) inserting into the interior of an internal cavity sectional mold a charge comprising a mass of coarse grained thermoplastic particles of a volume sufficient to cover the internal surface of the cavity to a predetermined thickness;
 (b) rotating said mold about compound axes so as to distribute said charge against the internal surface of the mold cavity;
 (c) subjecting said rotating mold to heat;
 (d) controlling the heat applied to the mold so that the particles of the charge fuse and autogenously weld only at portions of their surfaces in skin-to-skin contact to form a shell at other portions of their surfaces are spaced apart so as to fashion interstices between said particles constituting multiple vents in the shell and so that the particles retain their individualities;
 (e) opening the mold and forming an opening in the shell in registry therewith; and
 (f) concurrently cooling the mold and shell by applying a cooling medium to the exterior of the mold and introducing a cooling medium into the interior of the shell through the opening in the mold and the opening in the shell.

2. A method as set forth in claim 1 wherein the cooling medium is water.

3. A method as set forth in claim 1 wherein the cooling medium is a liquid and wherein the concurrent cooling of the mold and shell is effected by immersing the mold in the cooling medium and allowing the cooling medium to pour through the opening in the mold and the opening in the shell into the interior of the shell.

4. A method as set forth in claim 1 wherein the cooling medium is liquid and wherein the cooling of the mold and shell is effected by plunging the mold into the cooling medium and directing a stream of cooling medium through the opening in the mold and the registered opening in the shell into the interior of the shell.

References Cited
UNITED STATES PATENTS

| | | | |
|---|---|---|---|
| 2,761,177 | 9/1956 | Walters | 264—126 |
| 3,095,260 | 6/1963 | Ferriot | 264—311 |

ROBERT F. WHITE, *Primary Examiner.*

J. R. HALL, *Assistant Examiner.*